(12) United States Patent
Strzodka (10) Patent No.: US 9,297,488 B2
(45) Date of Patent: Mar. 29, 2016

(54) HOSE GUIDING DEVICE

(71) Applicant: Just Immobilien GmbH, Friedberg (DE)

(72) Inventor: Hubert Strzodka, Woelfersheim (DE)

(73) Assignee: Just Immobilien GmbH, Friedberg (DE)

( * ) Notice: Subject to any disclaimer, the term of this patent is extended or adjusted under 35 U.S.C. 154(b) by 0 days.

(21) Appl. No.: 14/370,840

(22) PCT Filed: Jan. 16, 2013

(86) PCT No.: PCT/DE2013/000022
§ 371 (c)(1),
(2) Date: Jul. 7, 2014

(87) PCT Pub. No.: WO2013/107440
PCT Pub. Date: Jul. 25, 2013

(65) Prior Publication Data
US 2015/0159798 A1 Jun. 11, 2015

(30) Foreign Application Priority Data
Jan. 17, 2012 (DE) .................... 20 2012 000 370 U
Apr. 27, 2012 (DE) .................... 20 2012 004 693 U (51) Int. Cl.
*F03B 17/02* (2006.01)
*F16L 55/02* (2006.01)
*F03B 17/04* (2006.01)
*F16L 3/16* (2006.01)

(52) U.S. Cl.
CPC ................. *F16L 55/02* (2013.01); *F03B 17/04* (2013.01); *F16L 3/16* (2013.01); *Y02E 10/20* (2013.01)

(58) Field of Classification Search
CPC ......... F03B 17/04; F03B 17/02; Y02E 10/20; F16L 55/02; F16L 3/16; F05B 2210/401; F05B 2210/40
USPC ...................................... 60/495–507
See application file for complete search history.

(56) References Cited

U.S. PATENT DOCUMENTS

| | | | | |
|---|---|---|---|---|
| 1,708,807 A | * | 4/1929 | Tatay ..................... | A63H 33/00 40/440 |
| 2,135,110 A | * | 11/1938 | Platt ....................... | F03B 17/02 60/496 |
| 3,194,008 A | * | 7/1965 | Baumgartner .......... | F03B 17/02 415/7 |
| 3,806,733 A | * | 4/1974 | Haanen ................... | F03B 17/02 290/44 |
| 3,934,964 A | * | 1/1976 | Diamond ................ | F03B 17/04 415/5 |
| 4,028,893 A | * | 6/1977 | Shaw ....................... | F03B 17/02 415/5 |
| 4,805,406 A | * | 2/1989 | Grsetic ................... | F03B 17/02 60/496 |

(Continued)

FOREIGN PATENT DOCUMENTS

| | | | |
|---|---|---|---|
| FR | 2 801 077 A1 | 5/2001 | |
| JP | S57-203877 A | 12/1982 | |
| WO | 81/01175 A1 | 4/1981 | |

OTHER PUBLICATIONS

International Search Report of PCT/DE2013/000022, mailed Aug. 6, 2013.

*Primary Examiner* — Christopher Garft
(74) *Attorney, Agent, or Firm* — Collard & Roe, P.C.

(57) ABSTRACT

The invention relates to a hose guiding device in which a hose (203) that is filled with a gaseous medium is guided through a liquid (201) in horizontal sections. The horizontal sections are supported on a gripping device. The movement of the gripping device is transmitted to a sprocket (214) via chains (207) in order to introduce or discharge the kinetic energy.

4 Claims, 6 Drawing Sheets

(56) References Cited

U.S. PATENT DOCUMENTS

| | | | | |
|---|---|---|---|---|
| 5,944,480 A * | 8/1999 | Forrest | F03B 17/04 | 415/5 |
| 6,305,165 B1 * | 10/2001 | Mizuki, Sr. | F03B 17/02 | 60/495 |
| 8,042,334 B2 * | 10/2011 | Ribeiro | F03B 17/04 | 290/1 R |
| 8,336,307 B2 * | 12/2012 | Teng | F03B 17/04 | 415/5 |
| 8,397,496 B2 * | 3/2013 | Frank | F03B 17/005 | 60/495 |
| 2006/0064975 A1 * | 3/2006 | Takeuchi | F03B 17/02 | 60/495 |
| 2007/0283689 A1 * | 12/2007 | McGahee | F03B 17/04 | 60/504 |
| 2010/0223922 A1 * | 9/2010 | McGahee | F03B 17/04 | 60/495 |
| 2012/0312008 A1 * | 12/2012 | Campos Alvarez | F03B 17/04 | 60/495 |

* cited by examiner

HOSE GUIDING DEVICE

CROSS REFERENCE TO RELATED APPLICATIONS

This application is the National Stage of PCT/DE2013/000022 filed on Jan. 16, 2013, which claims priority under 35 U.S.C. §119 of German Application Nos. 20 2012 000 370.4 filed on Jan. 17, 2012, and 20 2012 004 693.4 filed on Apr. 27, 2012, the disclosures of which are incorporated by reference. The international application under PCT article 21(2) was not published in English.

The invention relates to a hose guiding device having a hose filled with a gaseous medium and having a gripping device for the hose and having a container filled with liquid for passing the hose through, wherein the hose has a lesser density than the liquid.

In order to transfer energy, such as movement energy or heat energy, between the hose and the container, it is desirable to guide as large a section of the hose through the container as possible. This is the common drive principle of hose guiding devices and displacement machines. In this way, in the present application, hose guiding devices and displacement machines of the priority applications are supposed to represent the same objects.

The invention is based on the problem of further developing a hose guiding device of the type stated initially, in such a manner that it accommodates a particularly great hose length in the container filled with liquid.

This problem is solved, according to the invention, in that the hose is guided through the container in a vertical section and in a horizontal section, or in the form of a spiral having a vertical axis.

By means of the guidance in horizontal and vertical sections, the hose can be guided in meander shape, in approximately horizontal loops. The loops can be generated by means of the pivoting guiding part in the bottom region and by means of the gripping device. The guiding part furthermore seals off the container relative to the hose. Preferably, the guiding part is held, on its outside, in the shape of a hemisphere, in a correspondingly structured ball pan, and has a cylindrical recess for passing the hose through. The hose is preferably particularly flexible and has a low density. The liquid medium in the container is preferably water, and the gaseous medium in the hose is preferably air. In this way, the loops of the hose that are guided approximately horizontally have buoyancy in the container.

By means of the guidance of the hose through the container in the form of a spiral with a vertical axis, the hose is guided in a helical line. In this connection, multiple spiral sections of the hose occur, disposed one on top of the other. The hose is therefore not kinked or bent while it is guided through the container. Guidance of the hose takes place in that it is turned around the vertical axis of the spiral. For this reason, the hose does not experience any change in shape during the movement through the container and therefore has a long useful lifetime. The guiding part furthermore seals the container off relative to the hose. The low density of the hose is preferably produced in that the hose is filled with air. The liquid medium in the container is preferably water. As a result, the approximately horizontal spiral sections of the hose have buoyancy in the container. Preferably, the guiding part is held, on its outside, in the shape of a hemisphere, in a correspondingly structured ball pan, and has a cylindrical recess for passing the hose through.

An advantageous further development of the invention consists in that the gripping device is disposed in the container filled with liquid and guides the hose with approximately horizontal loops or at individual spiral sections, that the container has an introduction part in its bottom region, for passing the hose through, and sealing elements for sealing off the hose. Bends of the hose are preferably prevented if the introduction part has a pivoting guiding part.

By means of this embodiment, the hose is guided in meander shape by means of the approximately horizontal loops. The loops can be generated by means of the pivoting guiding part in the bottom region and by means of the gripping device. The guiding part furthermore seals the container off relative to the hose. Preferably, the guiding part is held, on its outside, in the shape of a hemisphere, in a correspondingly structured ball pan, and has a cylindrical recess for passing the hose through. The hose is preferably particularly flexible and has a low density. The liquid medium in the container is preferably water, and the gaseous medium in the hose is preferably air. As a result, the loops of the hose, which are guided approximately horizontally, have buoyancy in the container.

The gripping device is configured in particularly simple manner, in terms of design, according to another advantageous further development of the invention, if the gripping device has two chains disposed parallel to one another, and if grippers for supporting the loops of the hose that are guided approximately horizontally are disposed on the chains.

According to another advantageous further development of the invention, the gripping device is structured in particularly simple manner, in terms of design, if the gripping device has multiple chains or toothed belts disposed concentric to the vertical axis of the spiral, and if grippers for supporting the individual spiral sections of the hose are disposed on the chains or toothed belts.

Loops of different sizes can be guided in simple manner, according to another advantageous further development of the invention, if the grippers can be installed on the chains in different positions.

According to another advantageous further development of the invention, tensions within hose when it is fed into the introduction part can be prevented in simple manner if a basin containing a liquid is disposed underneath the container, and if the section of the hose situated directly ahead of the introduction part lies in the basin or floats on the surface of the liquid.

Continuous guidance of the hose can be guaranteed in simple manner, according to another advantageous further development of the invention, if a deflection roller for the hose is disposed above the container, and if the hose forms a closed ring.

According to another advantageous further development of the invention, the movement of the hose can be controlled in simple manner if the gripping device is connected with a pinion for supply and dissipation of the movement energy of the hose, by way of a chain.

According to another advantageous further development of the invention, the movement of the hose can be controlled in simple manner if the movements of the chain or toothed belts are coupled with one another and with a common wheel for supply and dissipation of the movement energy of the hose. In this way, it is ensured that all the chains and toothed belts and thereby also the grippers move at the same vertical speed.

The invention permits numerous embodiments. For further clarification of its fundamental principle, two of these are shown in the drawing and will be described below. The drawing shows, in.

Figure 1:
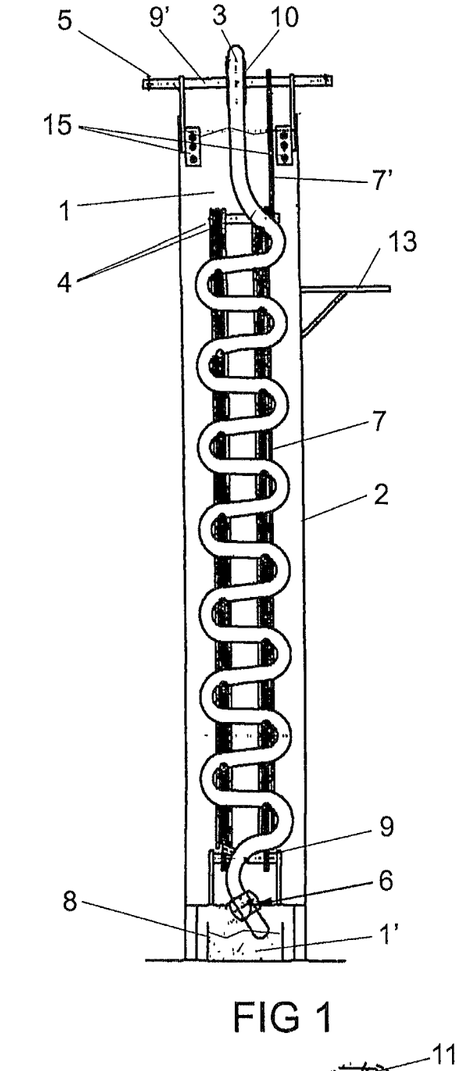
FIG. 1 a hose guiding device according to the invention.

FIG. 1 shows a hose guiding device that is frequently also referred to as a displacement machine, having a container 2 filled with a liquid 1, preferably water. This hose guiding device is furthermore shown in FIG. 2 in a side view. A hose 3 closed in ring shape and filled with air is guided through the container 2. A basin 8 with a liquid 1', preferably water, is disposed underneath the container 2, through which the hose 3 is passed to the bottom region of the container 2. An introduction part 6 is disposed in the bottom region, which part 6 allows introduction of the hose 3 into the container 2 and seals the container 2 off relative to the hose 3. It can be seen from the inclined representation of the introduction part 6 that the introduction part 6 can pivot as the result of the movements of the hose 3. The hose 3 is guided vertically through the container 2 in approximately horizontal loops, by a gripping device having two parallel chains 7. Grippers 14 are disposed on the chains 7 at planned intervals, to produce the loops. The chain 7 is guided laterally by guides 4. A shaft 9, having deflection pinions for the chains 7, not shown in any detail, is disposed at the lower deflection of the chains 7. A gear wheel 5 is disposed at the upper deflection, which is connected with a further chain 7' to form a shaft 9' that supports the deflection roller 10. The shaft 9' that supports the deflection roller 10 carries a pinion for supply and dissipation of movement energy.

Figure 2:
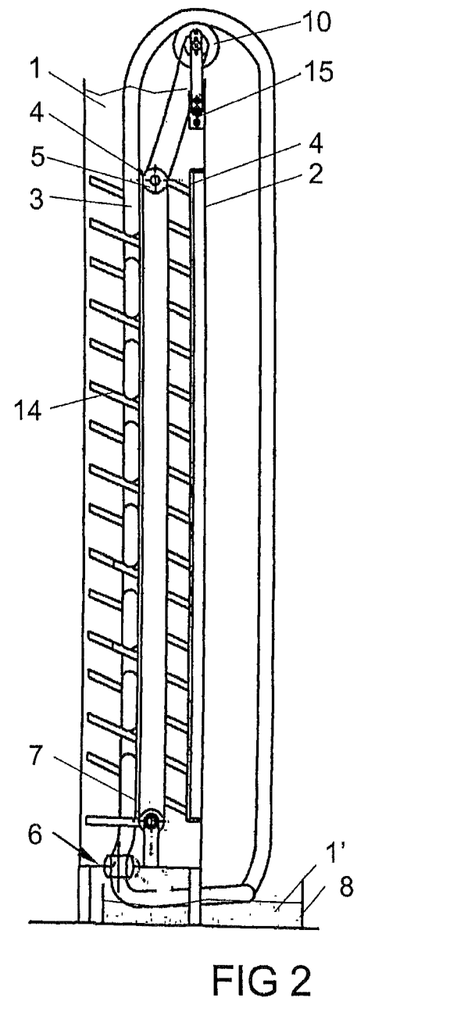
FIG. 2 a side view of the hose guiding device according to the invention from FIG. 1, FIG. 2a an enlarged sectional representation of an introduction part of the hose guiding device, FIG. 3 an enlarged sectional representation of the upper region part of the container, FIG. 4 a side view of the upper region part of the container, FIG. 5 an enlarged representation of the lower region part of the container, FIG. 6 a side view of the lower region part of the container, FIG. 7 a further embodiment of the hose guiding device, FIG. 8 a helical hose guiding device according to the invention, FIG. 9 a side view of the helical hose guiding device according to the invention from FIG. 8, FIG. 10 an enlarged sectional representation of an introduction part of the helical hose guiding device.

Furthermore, the hose guiding device has installation rails for holding the shaft 9' and a foundation 13 on which an operator, not shown, can walk.

Figure 2A:
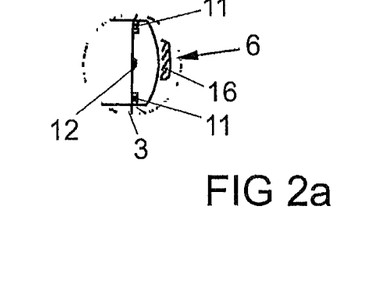

FIG. 2b shows the introduction part 6 from FIGS. 1 and 2 on a larger scale. In this connection, it can be seen that the introduction part 6 is structured in spherical shape on its outside and is mounted so as to pivot in a correspondingly structured pan-shaped wall of the bottom region of the container 2. Furthermore, the introduction part 6 has guiding parts 11 for axial guidance of the hose 3, and sealing elements 12 for sealing the container 2 off relative to the hose 3.

Figure 3:
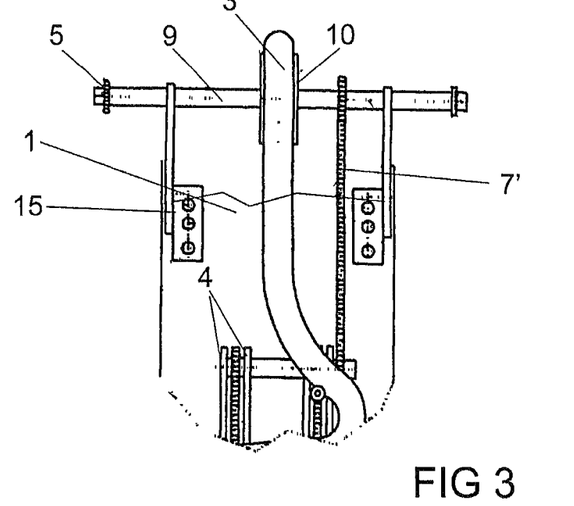
Figure 4:
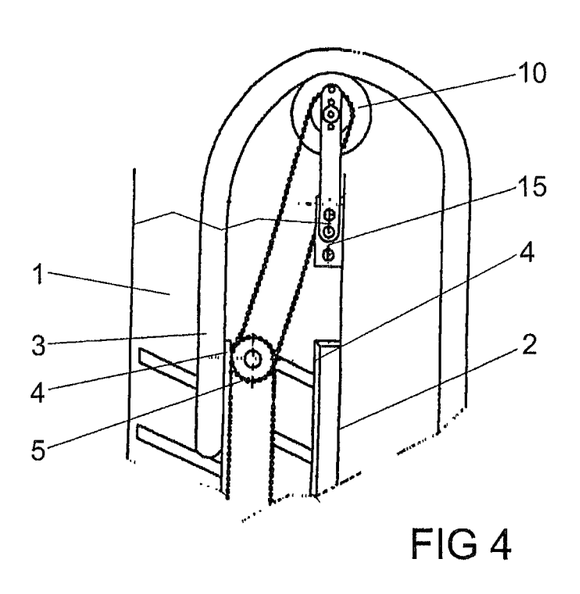

For clarification, the upper region of the hose guiding device, with the deflection roller 10, is shown in two views in FIGS. 3 and 4.

Figure 5:
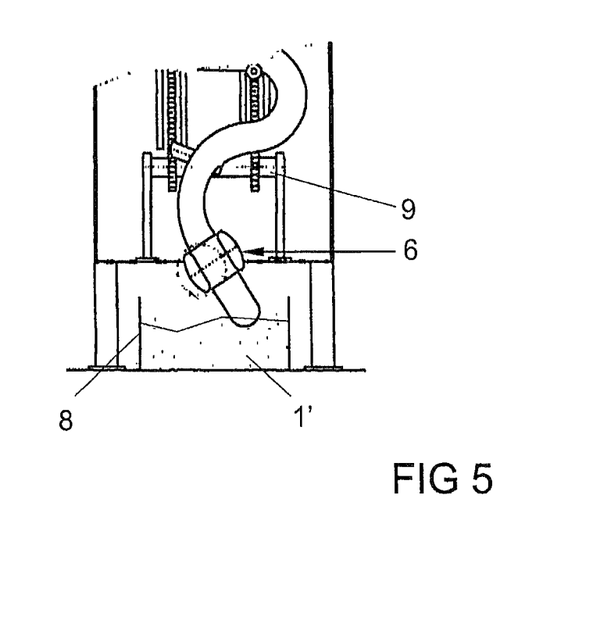
Figure 6:
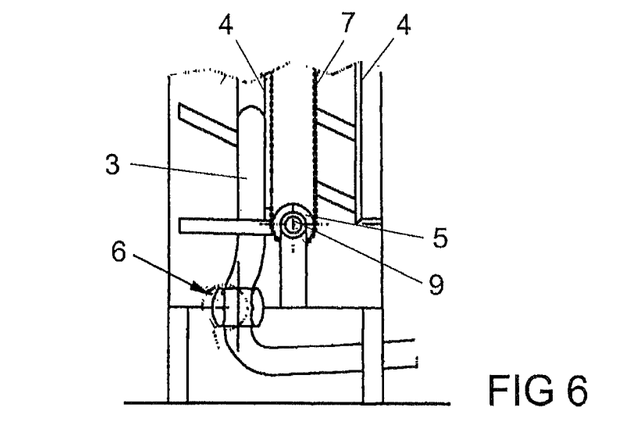

The lower region of the hose guiding device, with the introduction part 6, is shown in two views in FIGS. 5 and 6, for clarification.

Figure 7:
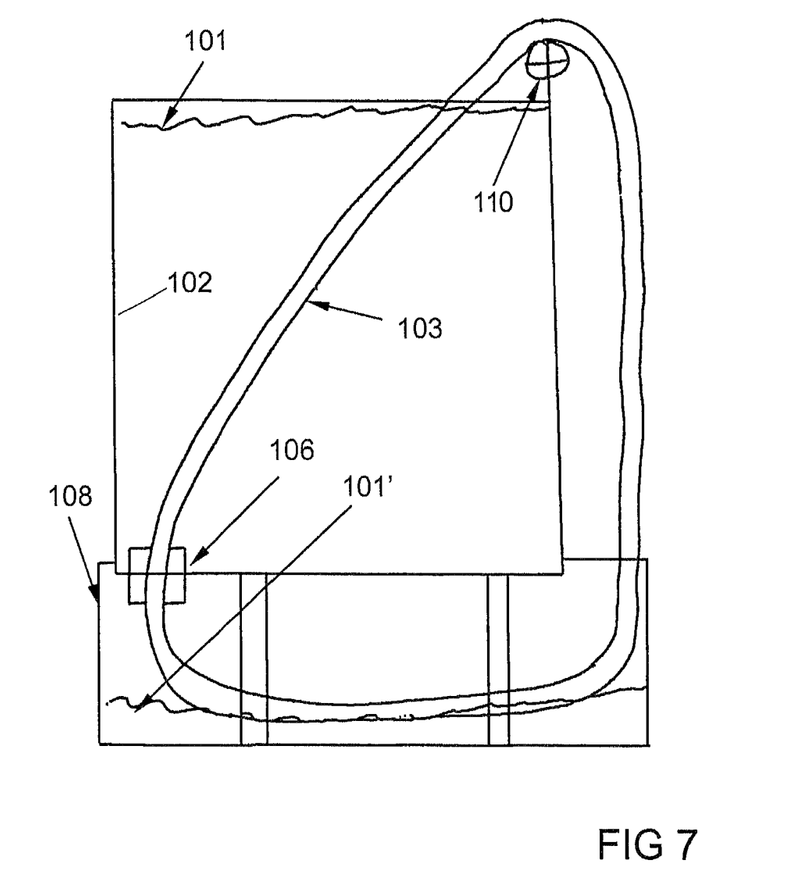

FIG. 7 shows a further embodiment of the hose guiding device, in which the hose 103 is guided diagonally from an introduction part 106 disposed in the bottom region of a container 102 filled with a liquid 101 to a deflection roller 110 disposed above the container 102. From the deflection roller, the hose is guided back to the introduction part 106 through a basin 108 filled with liquid 101'. In this way, the deflection roller forms the gripping device of the hose 103. Otherwise, this embodiment is structured like the one from FIGS. 1 to 6.

Figure 8:
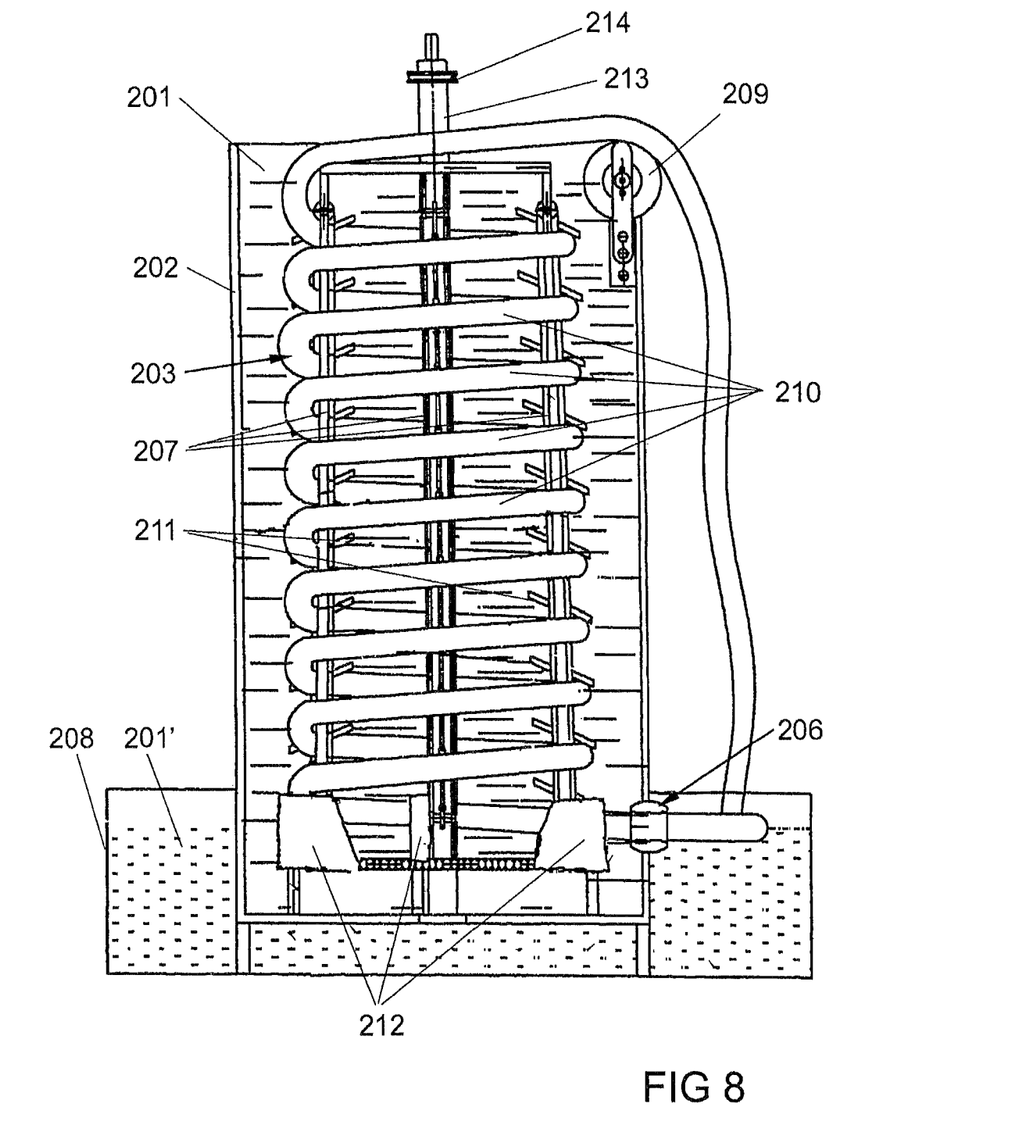

FIG. 8 shows a helical hose guiding device having a container 202 filled with a liquid 201, preferably water. This helical hose guiding device is furthermore shown in a side view in FIG. 9. A hose 203 that is closed in ring shape and filled with air is guided through the container 202. The hose 203 is guided within the container in the form of a spiral having a vertical axis. A basin 208 with a liquid 201', preferably water, is disposed underneath the container 202, through which the hose 203 is passed to the bottom region of the container 202. While being fed in, the hose 203 floats on the surface of the liquid 201' of the basin 208. An introduction part 206 is disposed in the bottom region of the container 202, which allows introduction of the hose 203 into the container 202 and seals the container 202 off relative to the hose 203. A deflection roller 209 is disposed at the top of the container 202.

Figure 9:
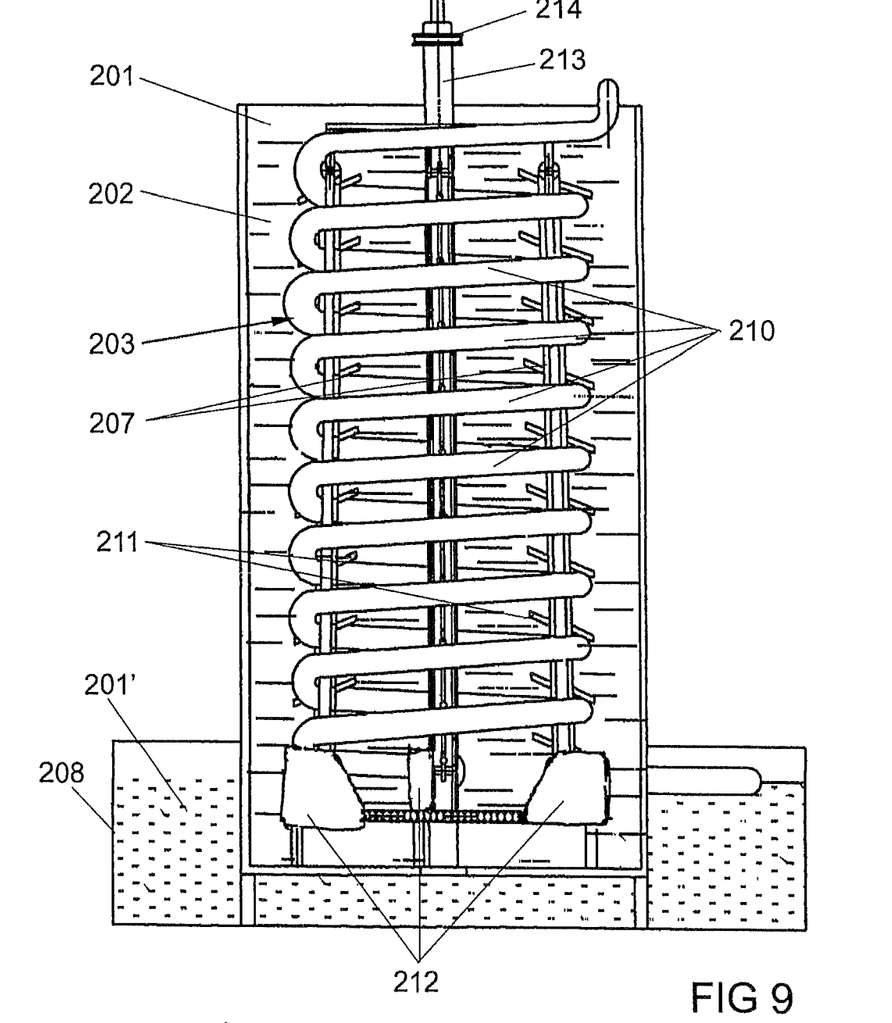

The hose 203 is held by a gripping device having multiple chains or toothed belts 207 disposed concentric to the vertical axis of the spiral of the hose 203. In this way, the hose 203 forms multiple spiral sections 210 disposed vertically one above the other. Grippers 211 are disposed on the chains or toothed belts 207 at planned intervals to produce the spiral sections 210. The movements of the chains or toothed belts 207 are coupled with one another by way of multiple deflection gear mechanisms 212. The deflection gear mechanisms 212 form a shape fit with a common vertical shaft 213. A wheel 214 for supply or dissipation of the movement energy of the hose 203 is attached to the shaft 213. The spiral sections 210 float in the liquid 201 as the result of buoyancy. In this connection, the spiral sections turn, with the gripping device, into the vertical axis formed by the shaft 213.

Figure 10:
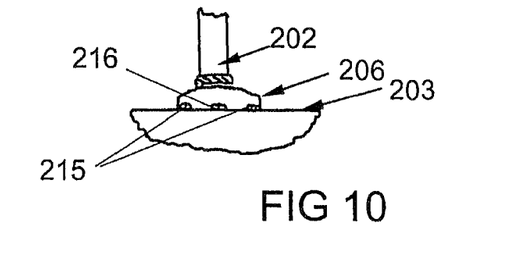

FIG. 10 shows the introduction part 206 from FIGS. 8 and 9 on an enlarged scale. In this connection, it can be seen that the introduction part 206 is structured in spherical shape on its outside and is mounted so as to pivot in a correspondingly structured pan-shaped wall of the bottom region of the container 202. Furthermore, the introduction part 206 has guiding parts 215 for axial guidance of the hose 203, and sealing elements 216 for sealing the container 202 off relative to the hose 203.

The invention claimed is:

1. A hose guiding device having a hose filled with a gaseous medium and having a gripping device for the hose and having a container filled with liquid for passing the hose through,
   wherein the hose has a lesser density than the liquid,
   wherein the hose is guided through the container in the form of a spiral having a vertical axis,
   wherein the gripping device is disposed in the container that is filled with liquid, and guides the hose with individual spiral sections,
   wherein the container has an introduction part for passing the hose through in its bottom region, and sealing elements for sealing the container off relative to the hose,
   wherein the gripping device has multiple chains or toothed belts, and
   wherein grippers for supporting the individual spiral sections of the hose are disposed on the chains or on the toothed belts.

2. The hose guiding device according to claim 1, wherein a basin containing a liquid is disposed underneath the container, and wherein a section of the hose situated directly ahead of the introduction part lies in the basin or floats on the surface of the liquid in the basin.

3. The hose guiding device according to claim 1, wherein a deflection roller for the hose is disposed above the container, and wherein the hose forms a closed ring.

4. The hose guiding device according to claim 1, wherein movements of the chains or toothed belts are coupled with one another and with a common wheel for supply or dissipation of movement energy of the hose.

* * * * *